United States Patent
Ikei

(10) Patent No.: US 8,237,396 B2
(45) Date of Patent: Aug. 7, 2012

(54) MOTOR DRIVING DEVICE, AND CONTROL METHOD OF MOTOR DRIVING DEVICE

(75) Inventor: Satoshi Ikei, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 416 days.

(21) Appl. No.: 12/457,206

(22) Filed: Jun. 3, 2009

(65) Prior Publication Data

US 2009/0309523 A1 Dec. 17, 2009

(30) Foreign Application Priority Data

Jun. 11, 2008 (JP) ................................. 2008-153175

(51) Int. Cl.
*H02P 23/00* (2006.01)
(52) U.S. Cl. .................... 318/808; 318/400.34
(58) Field of Classification Search ............. 318/400.34, 318/808
See application file for complete search history.

(56) References Cited

U.S. PATENT DOCUMENTS

| | | | |
|---|---|---|---|
| 4,607,205 A * | 8/1986 | Kito et al. ...................... 318/778 |
| 5,138,242 A | 8/1992 | Kim et al. | |
| 5,486,743 A * | 1/1996 | Nagai ...................... 318/400.13 |
| 8,018,188 B2 * | 9/2011 | Schwarzkopf et al. .. 318/400.35 |
| 2004/0130287 A1 * | 7/2004 | Sadasivam et al. ............ 318/799 |

FOREIGN PATENT DOCUMENTS

JP 6-343291 A 12/1994

* cited by examiner

*Primary Examiner* — Thomas Dougherty
(74) *Attorney, Agent, or Firm* — McGinn IP Law Group, PLLC

(57) ABSTRACT

A motor driving device includes a first power supply terminal, a second power supply terminal, a drive unit that is coupled to the first power supply terminal, the second power supply terminal, and a motor winding, a control unit that controls the drive unit, and a resistive element that is coupled between the drive unit and the first power supply terminal. The control unit makes the motor winding and the resistive element form a loop circuit when a voltage between the first power supply terminal and the second power supply terminal exceeds a predetermined value.

18 Claims, 9 Drawing Sheets

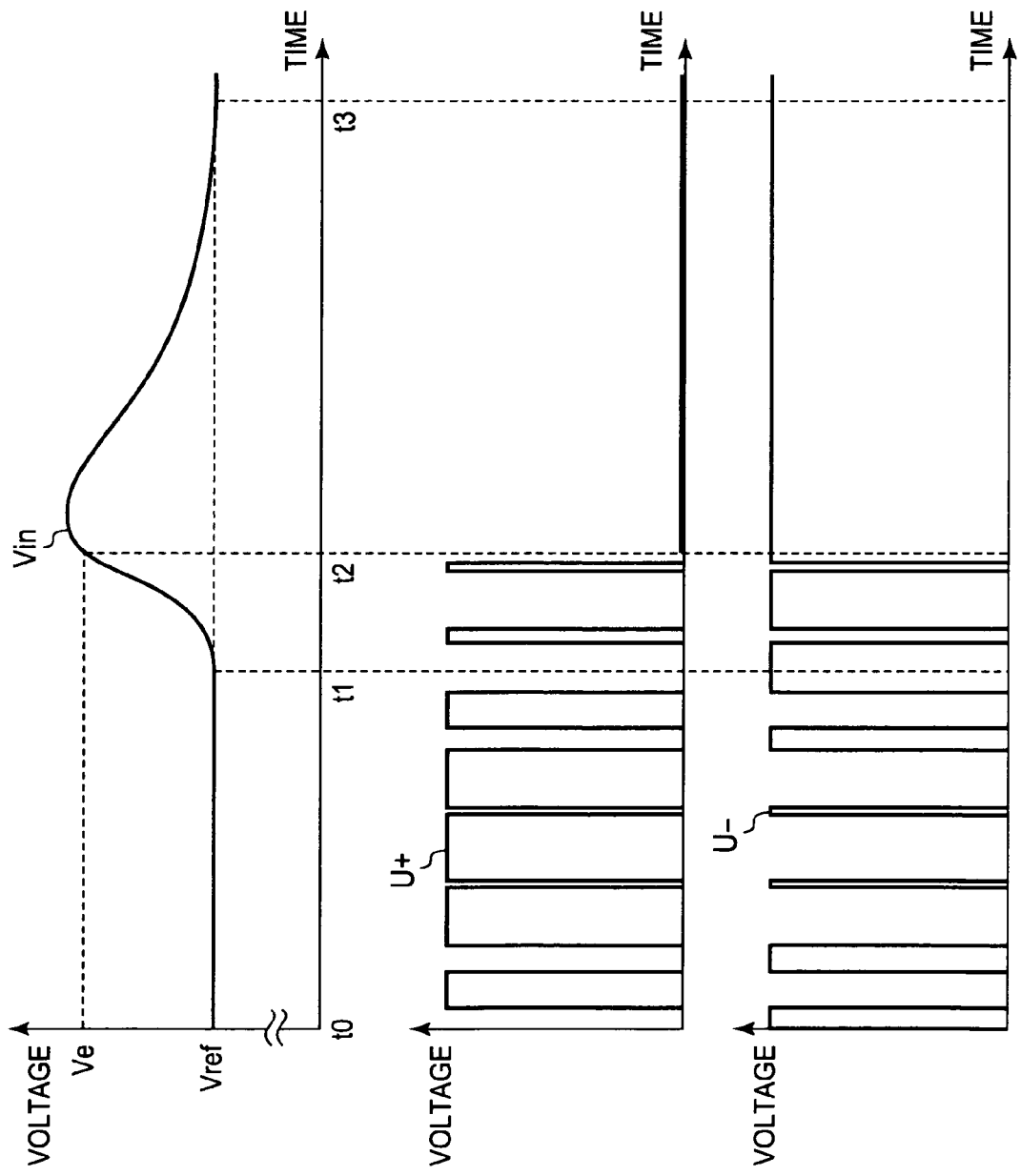

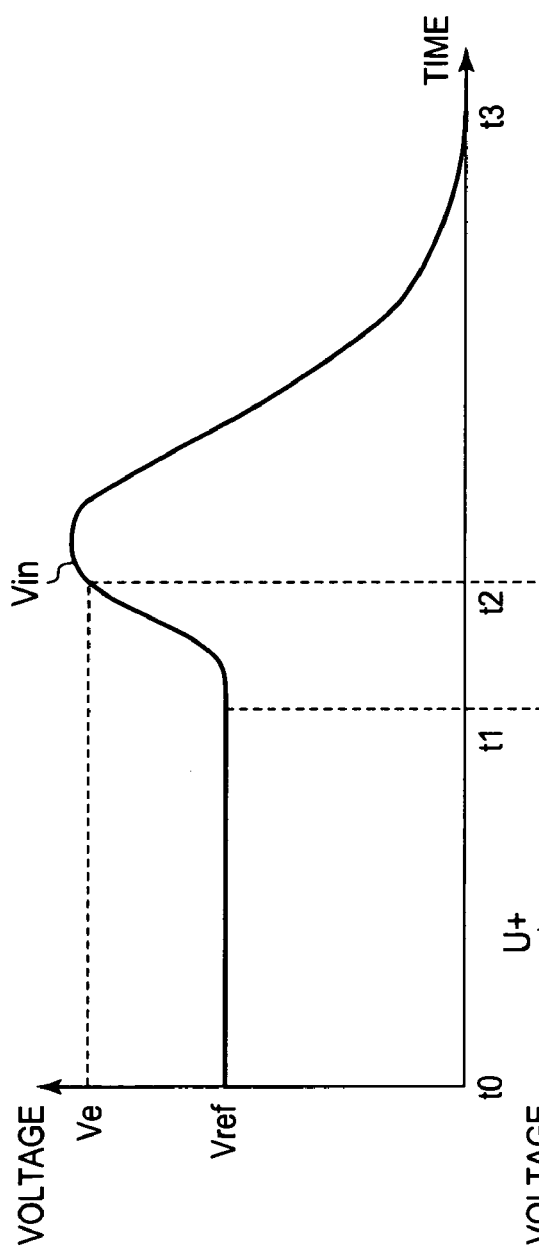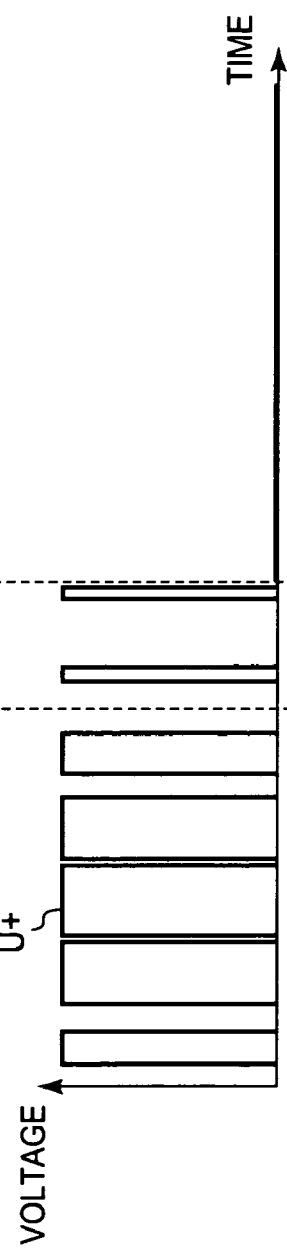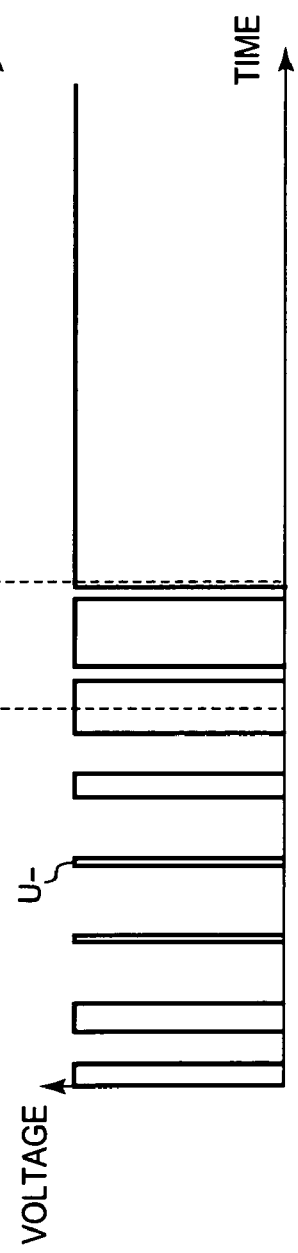

US 8,237,396 B2

MOTOR DRIVING DEVICE, AND CONTROL METHOD OF MOTOR DRIVING DEVICE

INCORPORATION BY REFERENCE

This application is based upon and claims the benefit of priority from Japanese Patent Application No. 2008-153175 which was filed on Jun. 11, 2008, the disclosure of which is incorporated herein in its entirety by reference.

BACKGROUND OF THE INVENTION

1. Field of the Invention

The present invention relates to a motor driving device and to a control method for the motor driving device, and specifically to a motor driving device for a brushless direct-current (hereinafter, referred to as "DC") motor and to a control method for the motor driving device.

2. Description of Related Art

Currently, in the field of consumer products, such as washing machines, refrigerators and air conditioners, for which machine downsizing has been demanded, small-sized and high-power permanent magnet synchronous motors have broadly been employed.

Also, in recent years, progress in technical innovation of power devices such as a Metal-Oxide-Semiconductor Field-Effect Transistor (hereinafter, referred to as "MOS FET") has been seen. Thus, it has become possible to perform inverter control in which a commercial alternating current (hereinafter, referred to as "AC") power supply is first rectified to be converted into a DC, and then re-produced to have a desired drive waveform by the switching-on/off of power devices. This inverter control easily provides power consumption reduction and also provides easy control. Currently, brushless DC motors, in which such a permanent magnet synchronous motor as described above is driven by inverter control, have widely been used.

FIG. 4 illustrates an inverter circuit 1 in a commonly-used brushless DC motor. As illustrated in FIG. 4, the inverter circuit 1 includes transistors Q1 to Q6. The transistors Q1 and Q2, Q3 and Q4, and Q5 and Q6 are respectively connected in series between a DC power supply voltage VDD and a ground voltage GND. Control signals U+, U−, V+, V−, W+ and W− are input to the transistors Q1 to Q6, respectively.

FIG. 5 illustrates an example of operation waveforms of the voltages of these control signals U+, U−, V+, V−, W+ and W−. Based on the pulse waveforms illustrated in FIG. 5, the transistors Q1 to Q6 perform switching operation in which they are repeatedly turned on or off. For example, at times t0 to t2, the control signals U+ and V− are coincidentally at a high level, and thus, the transistors Q1 and Q4 are coincidentally in an on-state. Consequently, currents flow in the coils in the U-phase and the V-phase of a brushless DC motor 2. Similarly, at times t2 to t4, control signals V+ and W− are coincidentally at a high level, and thus, the transistors Q3 and Q6 are coincidentally in an on-state. Consequently, currents flow in the coils in the V-phase and the W-phase of the brushless DC motor 2. Subsequently, the transistors are switched on/off based on the control signals in such a manner as described above, enabling the inverter circuit 1 to generate drive current for the brushless DC motor 2.

In this example, the brushless DC motor 2 is a three-phase motor. Accordingly, the on/off state of the transistors Q1 to Q6 is adjusted so that currents flowing in the coils in the U-phase, the V-phase and the W-phase of the brushless DC motor 2 flow in phases shifted from one another by 120°. The control signals U−, V− and W− are signals that are inversions of the control signals U+, W+ and V+, respectively.

Furthermore, pulse width modulation (hereinafter, referred to as "PWM") is used for motor drive control by the switching mentioned above. This PWM control is currently most commonly used as a DC motor control method. A brief description of PWM control will be provided with reference to FIGS. 6A and 6B. The graph in FIG. 6B illustrates one of the control signals U+, U−, V+, V−, W+ and W− being subjected to pulse-width modulation, for example, the control signal U+. Each of the other control signals is a signal having a wavelength similar to that of the example or a signal that is an inversion thereof, though its phase is shifted from that of the example.

PWM control in the example, as illustrated in FIG. 6A, uses a triangle wave as a carrier. Also, in order to control, e.g., the rotation speed of the motor to have a desired value, a command voltage signal, which is illustrated in FIG. 6A, is used. This command voltage signal and the triangle wave are compared with each other to determine the pulse widths of the control signal U+, as illustrated in FIG. 6B.

As illustrated in FIG. 6B, where the amplitude voltage of the command voltage signal is high, the widths of the pulses of the control signal U+ are large. Conversely, where the amplitude voltage is low, the pulse widths of the control signal U+ are small. Where the pulse widths are large, the on-state of the transistor lasts for a relatively long time, resulting in an increase in the currents flowing in the coils of the motor, and thereby raising the rotation speed of the motor. Conversely, where the pulse widths are small, the on-state of the transistor lasts only for a short time, thereby lowering the rotation speed of the motor. As described above, in PWM control, a command voltage signal is subjected to pulse width modulation, and the rotation speed of the motor is controlled by, e.g., the control signal U+ subjected to pulse width modulation.

Here, in inverter control for a brushless DC motor as described above, where it becomes unable to perform motor drive control due to, e.g., sudden deceleration of the motor or a system failure, the motor enters a regeneration (power generation) state due to the load-side inertia, generating a large back electromotive force (emf). In order to prevent the motor, the transistors, etc., in the inverter circuit, or a smoothing capacitor in a converter circuit that supplies the inverter circuit with power, from being broken due to such back electromotive force, a mechanism for back electromotive force removal is needed.

JP-A-HEI-6-343291 discloses a back electromotive force removal device 3 that upon the voltage on the input side of an inverter being abnormally increased by a back electromotive force from a motor, a current is made to flow in a regeneration load resistor to remove the back electromotive force. FIG. 7 illustrates a configuration of the back electromotive force removal device 3. As illustrated in FIG. 7, the back electromotive force removal device 3 includes a power supply unit 4, a back electromotive force detection unit 5, a MOS FET base driver 6, a back electromotive force removal unit 7, a first display unit 8 and a second display unit 9.

SUMMARY

However, the present inventor has recognized the following point. Namely, in the back electromotive force removal device 3 according to JP-A-HEI-6-343291, upon an abnormal voltage, which has been increased by a back electromotive force, being detected between power supply input terminals DC+ and DC−, a MOS FET 71 in the back electromotive force removal unit 7 is controlled to be turned on or off. Consequently, a current I73 is made to flow in a regeneration load resistor R72 connected between the power supply input terminals DC+ and DC− and consumed as thermal energy, thereby removing the back electromotive force. However, in this method, a plethora of current I73 flows instantaneously in the regeneration load resistor R72. Consequently, the back electromotive force removal unit 7 is required to have a large generation load resistor 72 and MOS FET 71, which can tolerate the plethora of current, thereby increasing the circuit size. In addition, a control circuit dedicated to control the on/off state of the MOS FET 71 is required, thereby also increasing the circuit size.

The present invention seeks to solve one or more of the above problems, or to improve upon those problems at least in part.

In one exemplary embodiment, a motor driving device includes a first power supply terminal, a second power supply terminal, a drive unit that is coupled to the first power supply terminal, the second power supply terminal, and a motor winding, a control unit that controls the drive unit, and a resistive element that is coupled between the drive unit and the first power supply terminal. The control unit makes the motor winding and the resistive element form a loop circuit when a voltage between the first power supply terminal and the second power supply terminal exceeds a predetermined value.

In another exemplary embodiment, a control method is provided for a motor driving device which includes a drive unit coupled to a first power supply terminal, a second power supply terminal, and a motor winding, and a resistive element coupled between the drive unit and the first power supply terminal. The control method includes making the motor winding and the resistive element form a loop circuit when a voltage between the first power supply terminal and the second power supply terminal exceeds a predetermined value.

In yet another exemplary embodiment, a data processing apparatus controls an inverter circuit for a motor. The data processing apparatus includes a control unit that monitors a potential of a power supply terminal to supply power to the inverter circuit, and obtains an information indicative of an amount of a driving current flowing in a motor winding of the motor in response to an amount of a current flowing in a resistive element included in the inverter circuit, to control a driving of the motor. The control unit makes the motor winding and the resistive element form a loop circuit when the potential of the power supply terminal exceeds a predetermined value.

Therefore, when the voltage of the first power supply terminal is increased to a predetermined value due to a back electromotive force as result of the motor entering, e.g., a regeneration (power generation) state, the motor winding and the resistive element form a closed loop configuration. Consequently, the back electromotive force can be absorbed by the resistive element as thermal energy. Further, the present invention enables absorption of a back electromotive force without increasing a circuit size.

BRIEF DESCRIPTION OF THE DRAWINGS

The above and other purposes, advantages and features of the present invention will become more apparent from the following description of a certain exemplary embodiment taken in conjunction with the accompanying drawings in which:

FIG. 2A illustrates an example of an operation timing chart for a motor driving device according to the first exemplary embodiment;

FIG. 2B illustrates an example of an operation timing chart for a motor driving device according to the first exemplary embodiment;

FIG. 2C illustrates an example of an operation timing chart for a motor driving device according to the first exemplary embodiment;

FIG. 3A illustrates an example of an operation timing chart for a motor driving device according to the first exemplary embodiment;

FIG. 3B illustrates an example of an operation timing chart for a motor driving device according to the first exemplary embodiment;

FIG. 3C illustrates an example of an operation timing chart for a motor driving device according to the first exemplary embodiment;

DETAILED DESCRIPTION OF THE EXEMPLARY EMBODIMENTS

The invention will now be described herein with reference to an illustrative exemplary embodiment. Those skilled in the art will recognize that many alternative embodiments can be accomplished using the knowledge of the present invention, and that the invention is not limited to the exemplary embodiment illustrated for explanatory purposes.

Hereinafter, a first exemplary embodiment of the present invention will be described with reference to the accompanying drawings.

First Exemplary Embodiment

Figure 1:
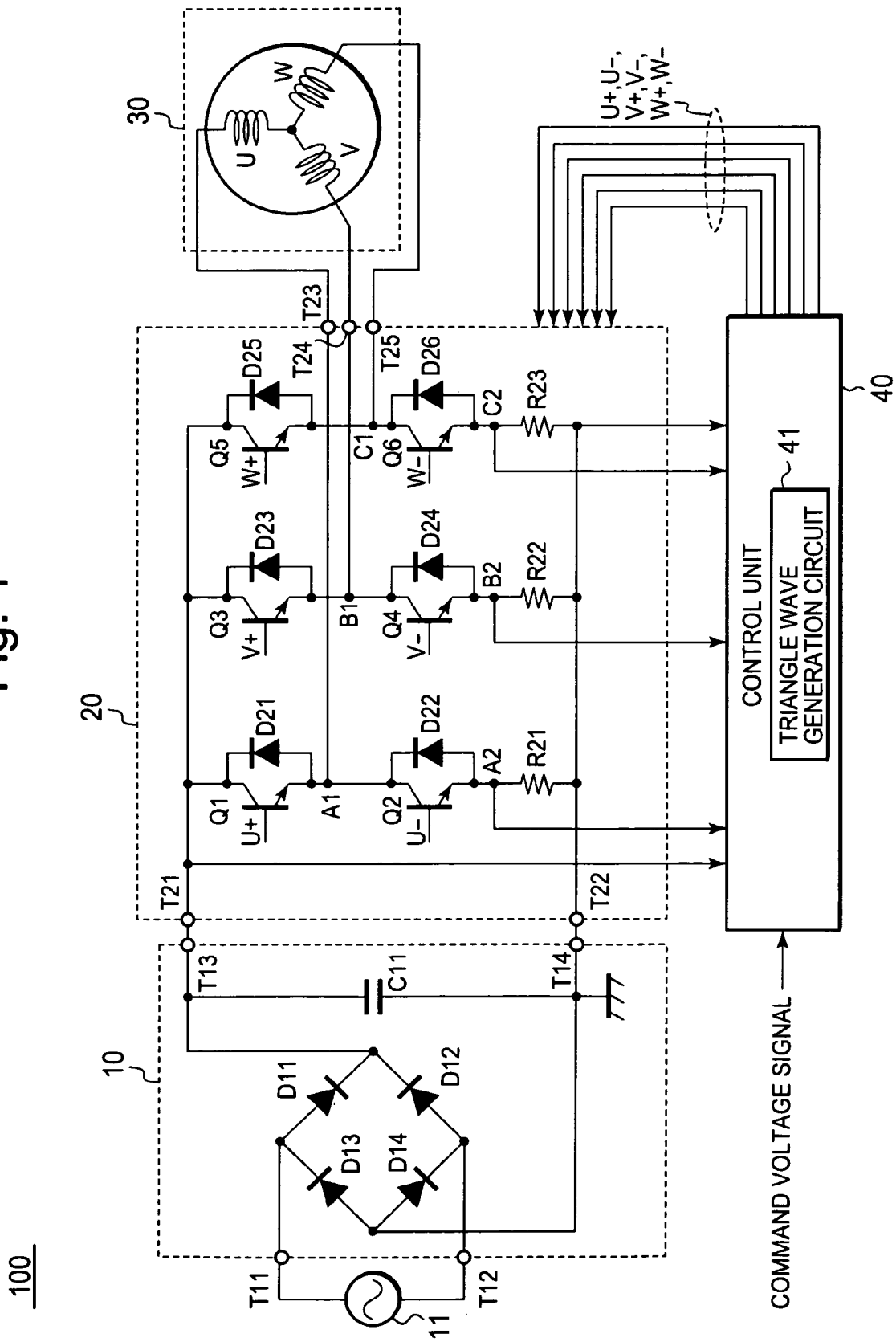
FIG. 1 illustrates an example of a configuration of a motor driving device an example of an operation timing chart for a motor driving device 100 according to the first exemplary embodiment.
Figure 4:
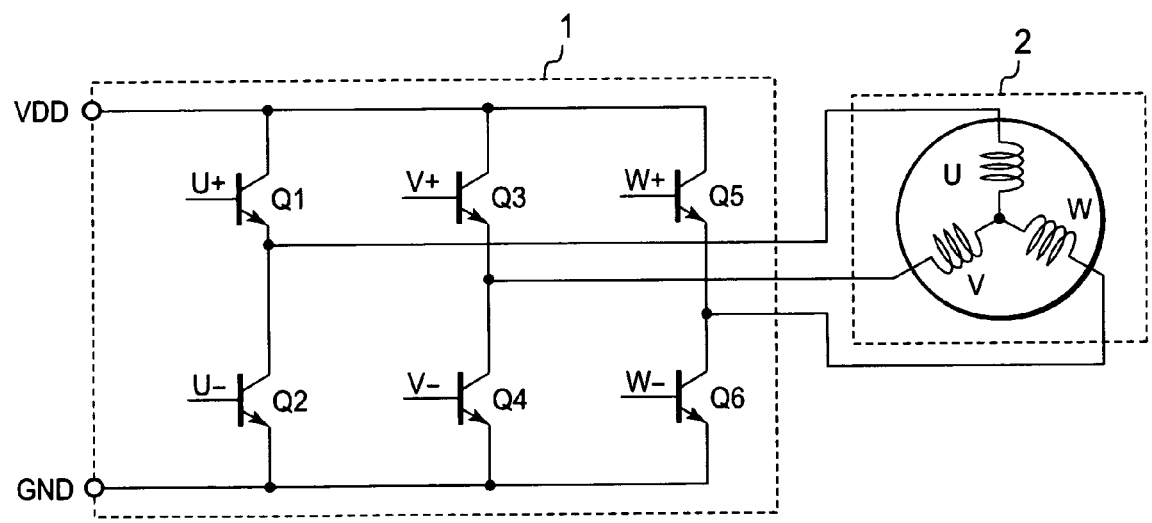
FIG. 4 illustrates an example of a configuration of a motor driving device according to a related art.
Figure 5:
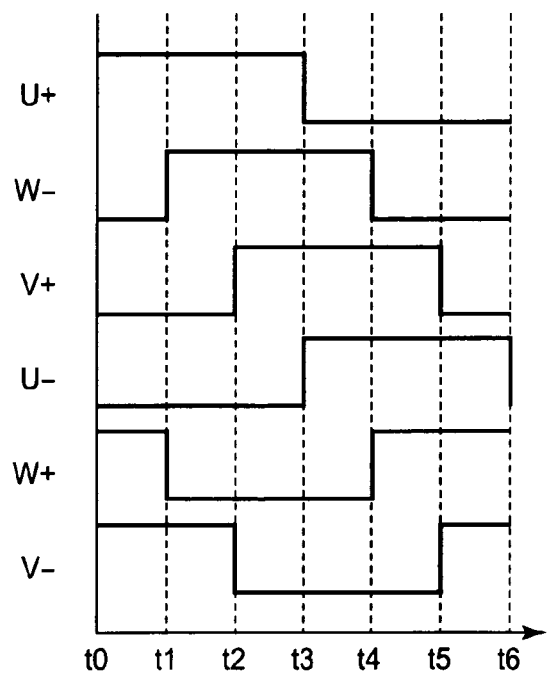
FIG. 5 illustrates, an example of an operation timing chart for an inverter unit 1 according to a related art.

The first exemplary embodiment is one in which the present invention is applied to a motor driving device. FIG. 1 illustrates an example of the configuration of a motor driving device 100 according to the first exemplary embodiment. As illustrated in FIG. 1, the motor driving device 100 includes a converter unit 10, an inverter unit 20, a brushless DC motor 30 and a control unit 40.

The converter unit 10 rectifies a voltage from a commonly-used commercial AC power supply 11 and converts the voltage into a DC voltage. The converter unit 10 includes input terminals T11 and T12, output terminals T13 and T14, rectifier diodes D11 to D14, and a smoothing capacitor C11. It also includes input terminals T11 and T12, and output terminals T13 and T14. The anode of the rectifier diode D11 is connected to the input terminal T11, and the cathode of the rectifier diode D11 is connected to the output terminal T13.

The anode of the rectifier diode D12 is connected to the input terminal T12 and the cathode of the rectifier diode D12 is connected to the output terminal T13. The anode of the rectifier diode D13 is connected to the output terminal T14, and the cathode of the rectifier diode D13 is connected to the input terminal T11. The anode of the rectifier diode D14 is connected to the output terminal T14, and the cathode of the rectifier diode D14 is connected to the input terminal T12. One terminal of the smoothing capacitor C1 is connected to the output terminal T13, and the other terminal of the smoothing capacitor C1 is connected to the output terminal T14. A ground voltage terminal GND is connected to the output terminal T14.

The inverter unit 20 includes NPN transistors Q1 to Q6, clamp diodes D21 to D26, and resistive elements R21 to R23. It also includes power supply input terminals T21 and T22, and output terminals T23 to T25.

The NPN transistors Q1 to Q6 are switching elements (i.e., a drive unit) for controlling motor drive currents flowing in the U-phase, the V-phase and the W-phase of the brushless DC motor 30, which will be described later.

The collector of the NPN transistor Q1 is connected to the input terminal T21, and the emitter of the NPN transistor Q1 is connected to a node A1. The collector of the NPN transistor Q2 is connected to the node A1, and the emitter of the NPN transistor Q2 is connected to a node A2. The collector of the NPN transistor Q3 is connected to the input terminal T21, and the emitter of the NPN transistor Q3 is connected to a node B1. The collector of the NPN transistor Q4 is connected to the node B1, and the emitter of the NPN transistor Q4 is connected to a node B2. The collector of the NPN transistor Q5 is connected to the input terminal T21, and the emitter of the NPN transistor Q5 is connected to a node C1. The collector of the NPN transistor Q6 is connected to the node C1, and the emitter of the NPN transistor Q6 is connected to a node C2.

Control signals U+, U−, V+, V−, W+ and W− from the control unit 40 are input to the bases of the NPN transistors Q1 to Q6, respectively. The nodes A1 to C1 are connected to the output terminals T23 to T25, respectively.

The clamp diodes D21 to D26 are connected between the collectors and the emitters of the NPN transistors Q1 to Q6 in non-parallel fashion to the NPN transistors Q1 to Q6, respectively. The resistive elements R21 to R23 are resistors for detecting motor drive currents flowing in the U-phase, the V-phase and the W-phase of the brushless DC motor 30. By measuring the amounts or phases of currents flowing in these resistive elements R21 to R23, which phase a current flows in the brushless DC motor 30 can be detected. Also, by measuring the phase of this current, information such as the rotational position of the rotor in the brushless DC motor 30 can be obtained. It is desirable that these resistive elements R21 to R23 be formed by shunt resistors because they are used for current measurement. However, the resistive elements, R21 to R23 are not limited only to shunt resistors in terms of the resistor type.

The brushless DC motor 30 includes, e.g., a permanent magnet synchronous motor. The brushless DC motor 30 includes coils for three phases, i.e., the U-phase, the V-phase and the W-phase as stators. Upon currents from the inverter unit 20 flowing in these three-phase coils, a rotor including a permanent magnet rotates. The coils in the U-phase, the V-phase and the W-phase of the brushless DC motor 30 are connected to the output terminals T23, T24 and T25 of the inverter unit 20, respectively.

The control unit 40 generates the control signals U+, U−, V+, V−, W+ and W− and outputs them to the inverter unit 20. Also, it monitors a voltage Vin between the input terminals T21 and T22 of the inverter unit 20. Also, it monitors the voltages of the nodes A2, B2 and C2, and measures currents flowing in the resistive elements R21 to R23. This enables detection of a failure, etc., occurring in the brushless DC motor 30 when an over-current flows in any of the resistive elements R21 to R23. Furthermore, by measuring the phases of the currents flowing in the resistive elements R21 to R23, for example, the position of the rotor in the brushless DC motor 30 can be detected.

The control unit 40 includes a triangle wave generating circuit 41. The triangle wave generating circuit 41 generates a triangle wave as a carrier for PWM control. The triangle wave generating circuit 41 may be provided outside the control unit 40, and supply a triangle wave that the circuit 41 has generated to the control unit 40.

Figure 6:
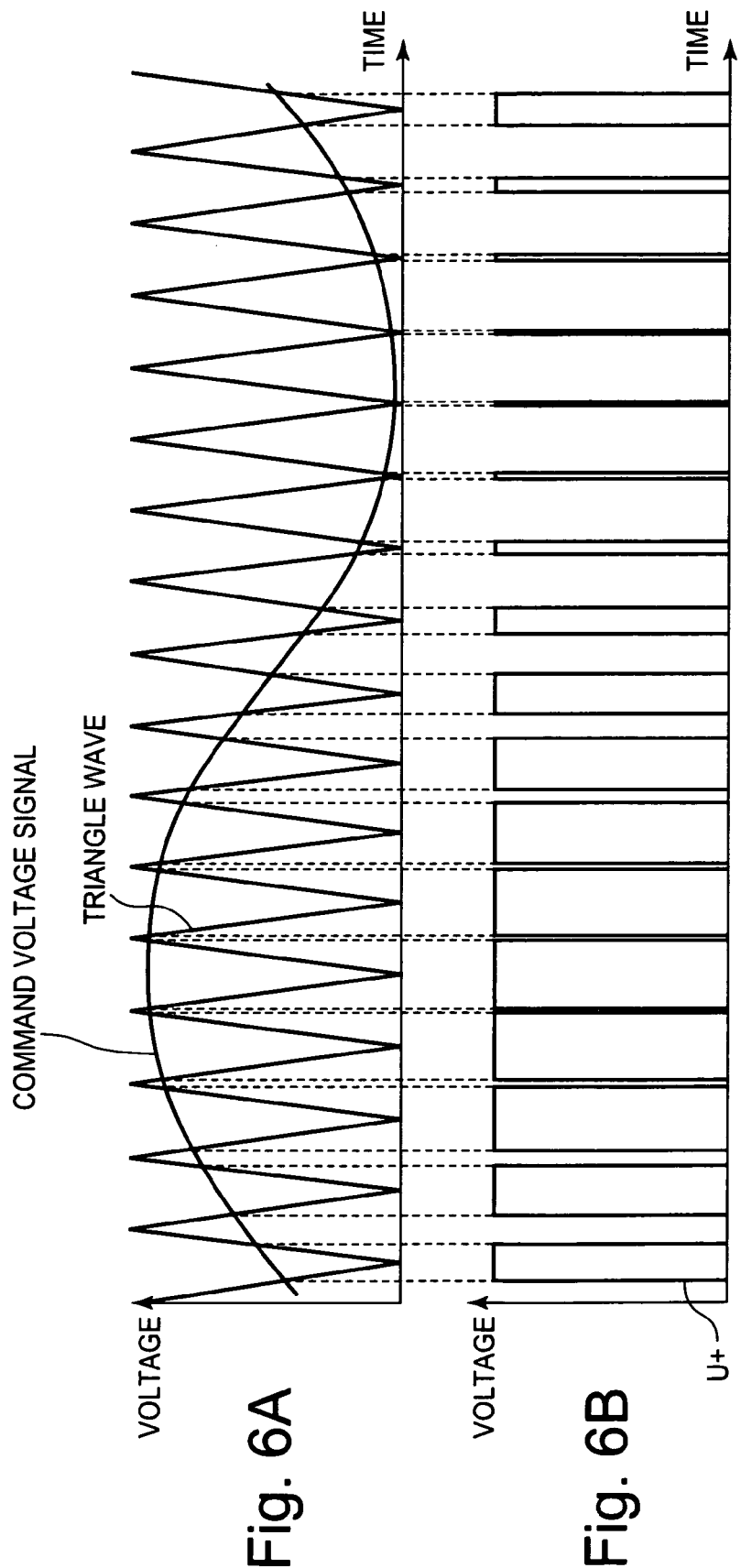
FIG. 6A illustrates an example of a timing chart for describing PWM control.
FIG. 6B illustrates an example of a timing chart for describing PWM control.
Figure 7:
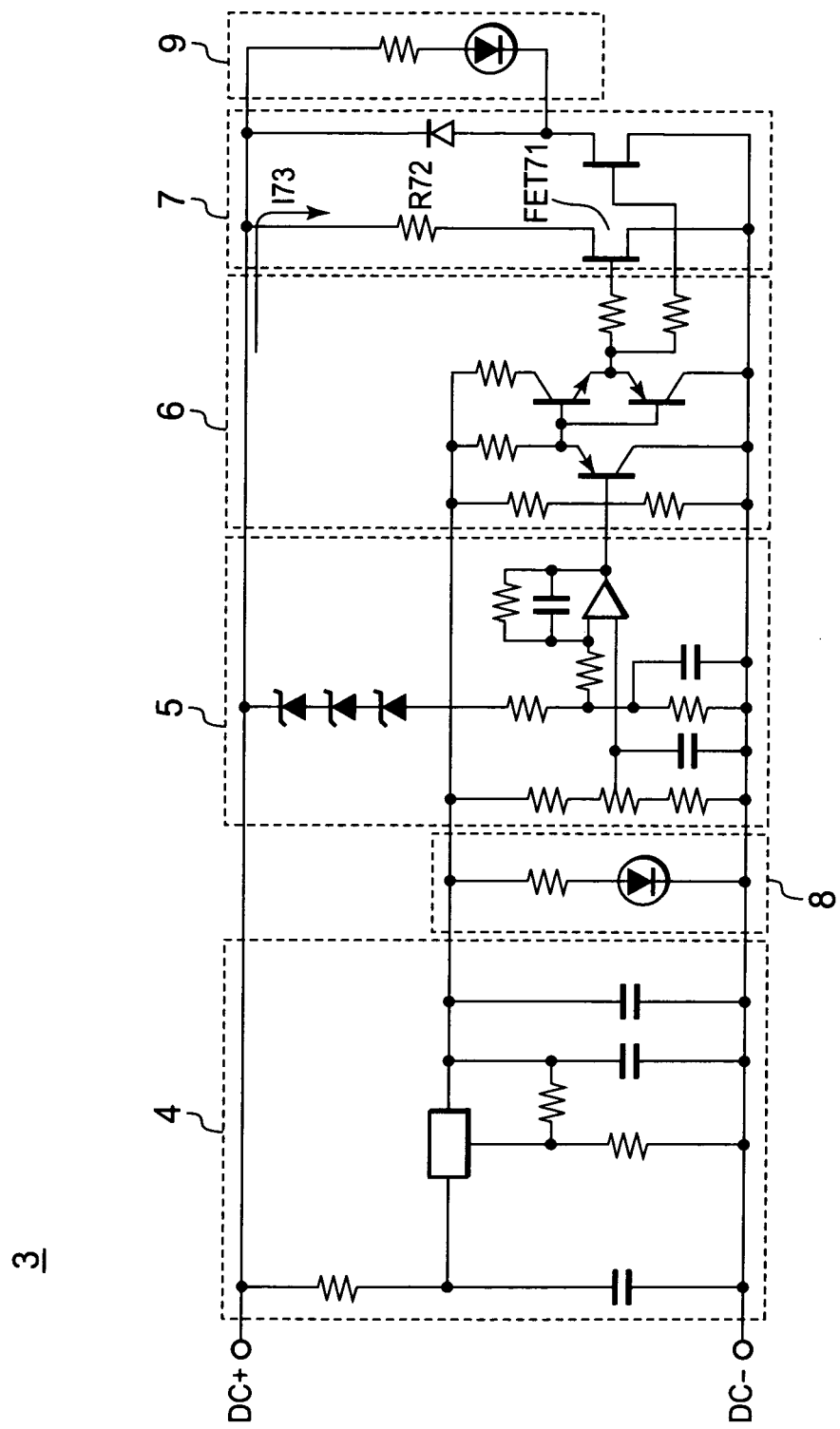
FIG. 7 illustrates a configuration of a back electromotive force removal device of JP-A-HEI-6-343291.

In a normal operation state, the control unit 40 outputs the control signals U+, U−, V+, V−, W+ and W− subjected to pulse width modulation, which are similar to that described with reference to the timing chart in FIG. 6B. The switching-on/off of the NPN transistors Q1 to Q6 in the inverter unit 20 is controlled by these control signals U+, U−, V+, V−, W+ and W−. Here, the currents flowing in the NPN transistors Q1 to Q6 are output to the output terminals T23 to T25 as drive currents for the brushless DC motor 30. The control signals U+, U−, V+, V−, W+ and W− are subjected to pulse width modulation using a triangle wave generated by the triangle wave generating circuit 41 and a command voltage signal. Here, the command voltage signal is a control signal for controlling the brushless DC motor 30 to have a desired rotation speed. Since the relationship between this triangle wave, the command voltage signal and the pulse widths of the generated control signal U+, etc., are similar to that described with reference to FIGS. 6A and 6B, a description thereof will be omitted.

When the voltage Vin between the input terminals T21 and T22 of the inverter unit 20 becomes an abnormal voltage equal to or exceeding an abnormality detection voltage Ve, the control unit 40 performs control so as to forcibly make the NPN transistors Q1, Q3 and Q5 enter an off-state and make the NPN transistors Q2, Q4 and Q6 enter an on-state by the control signals U+, U−, V+, V−, W+ and W−.

Next, an operation of the motor driving device 100, which has been described above, will be described in detail with reference to the drawings.

FIGS. 2A, 2B and 2C illustrate a timing of an operation of the motor driving device 100. FIG. 2A indicates the voltage between the input terminals T21 and T22 of the inverter unit 20. FIG. 2B illustrates the pulse waveform of the control signal U+. FIG. 2C illustrates the pulse waveform of the control signal U−. In this example, description will be made only on the control signals U+ and U−.

As illustrated in FIG. 2A, times from t0 to t1, the voltage Vin between the input terminals T21 and T22 of the inverter unit 20, which is detected by the control unit 40, is constantly a reference voltage Vref. Accordingly, the control signals U+ and U− output by the control unit 40 to the inverter unit 20 each have a pulse waveform in a normal operation state.

Here, at the time t1, the motor driving device 100 becomes unable to perform drive control for the motor due to, e.g., sudden deceleration of the brushless DC motor 30 or a system failure. In this case, the motor enters a regeneration state (power generation state) due to, e.g., the load inertia. A back electromotive force from the motor raises the voltage Vin on the input side, that is, between the input terminals T21 and T22, of the inverter unit 20.

At the time t2, the voltage Vin between the input terminals T21 and T22 of the inverter unit 20, which is detected by the control unit 40, becomes larger than the abnormality detection voltage Ve (hereinafter, referred to as "abnormal state"). Here, the control unit 40 fixes the control signals U+, V+ and W+ at a low level and the control signals U−, V− and W− at a high level. Consequently, the NPN transistors Q1, Q3 and Q5 are forcibly brought to an off-state, and the NPN transistors Q2, Q4 and Q6 are forcibly brought to an on-state. In other words, all the transistors on the high side of the inverter unit 20 are interrupted, and all the transistors on the low side enter a conductive state. Upon all the transistors on the low side entering a conductive state, motor drive wires for the U-phase, the V-phase and the W-phase of the brushless DC motor 30 and the resistive elements R21 to R23 form a closed loop. Consequently, the back electromotive force generated by the motor due to its regeneration state is absorbed by the resistive elements R21 to R23 as thermal energy, and the voltage Vin between the input terminals T21 and T22 gradually decreases.

At a time t3, the voltage Vin between the input terminals T21 and T22 is lowered to the reference voltage Vref, thereby ending the abnormal state. Subsequently, the control unit 40 may output the control signals U+, U−, V+, V−, W+ and W− in a normal operation state again to the inverter unit 20. Also, where the control unit 40 determines that the drive control for the motor cannot be performed due to, e.g., a system failure, it is possible to continue fixing the control signals U+, V+ and W+ at a low level and fixing the control signals U−, V− and W− at a high level.

Also, at the time when the control unit 40 has detected an abnormal state, the converter unit 10's power supply to the inverter unit 20 may be interrupted. In this case, as illustrated in FIGS. 3A, 3B and 3C, the voltage Vin is lowered to the ground voltage at the time t3.

As described above, in the motor driving device 100 according to the first exemplary embodiment, a back electromotive force generated by the motor due to its regeneration state is absorbed by, e.g., the shunt resistors that are originally (e.g., primarily) used for drive control for the motor, as thermal energy. Consequently, it is not necessary to provide additional resistive elements specifically for back electromotive force absorption to the motor driving device 100. Accordingly, there is no specific need to provide a large-sized regeneration resistor and MOS FET, the MOS FET being a switch for control, which are needed in patent document 1. Accordingly, an increase in size of the circuits in the device can be prevented, and thus, the manufacturing costs, etc., of the device can be reduced.

Also, upon detection of a predetermined voltage such as the abnormality detection voltage Ve, the above-described operation starts, and thus, an advantage can be provided in eliminating the necessity to use transistors and/or smoothing capacitors having an excessive pressure resistance.

Also, where shunt resistors are used for the resistive elements R21 to R23, the following advantage can be provided. Shunt resistors exhibit a low resistance since they are usually used for current measurement. Accordingly, a back electromotive force generated as a result of the motor's regeneration state is gradually absorbed by the shunt resistors. In this case, the mechanical load imposed on the motor is lower compared to the case where the motor is suddenly stopped by a dynamic brake formed by directly short-circuiting the motor drive wires for the U-phase, the V-phase and the W-phase via switches or the like. Consequently, the possibility of breakage of the motor can be reduced. Also, because of the resistance values being low, there is only a small problem in heat generation in the resistive elements.

Furthermore, the NPN transistors included in the inverter unit 20 may be MOSFETs or Insulated Gate Bipolar Transistors. Also, the brushless DC motor 30 may be a two-phase or multiple-phase motor, rather than a three-phase motor. Also, although a triangle wave has been used for a carrier for pulse width modulation, e.g., a sawtooth wave may be used.

Figure 8:
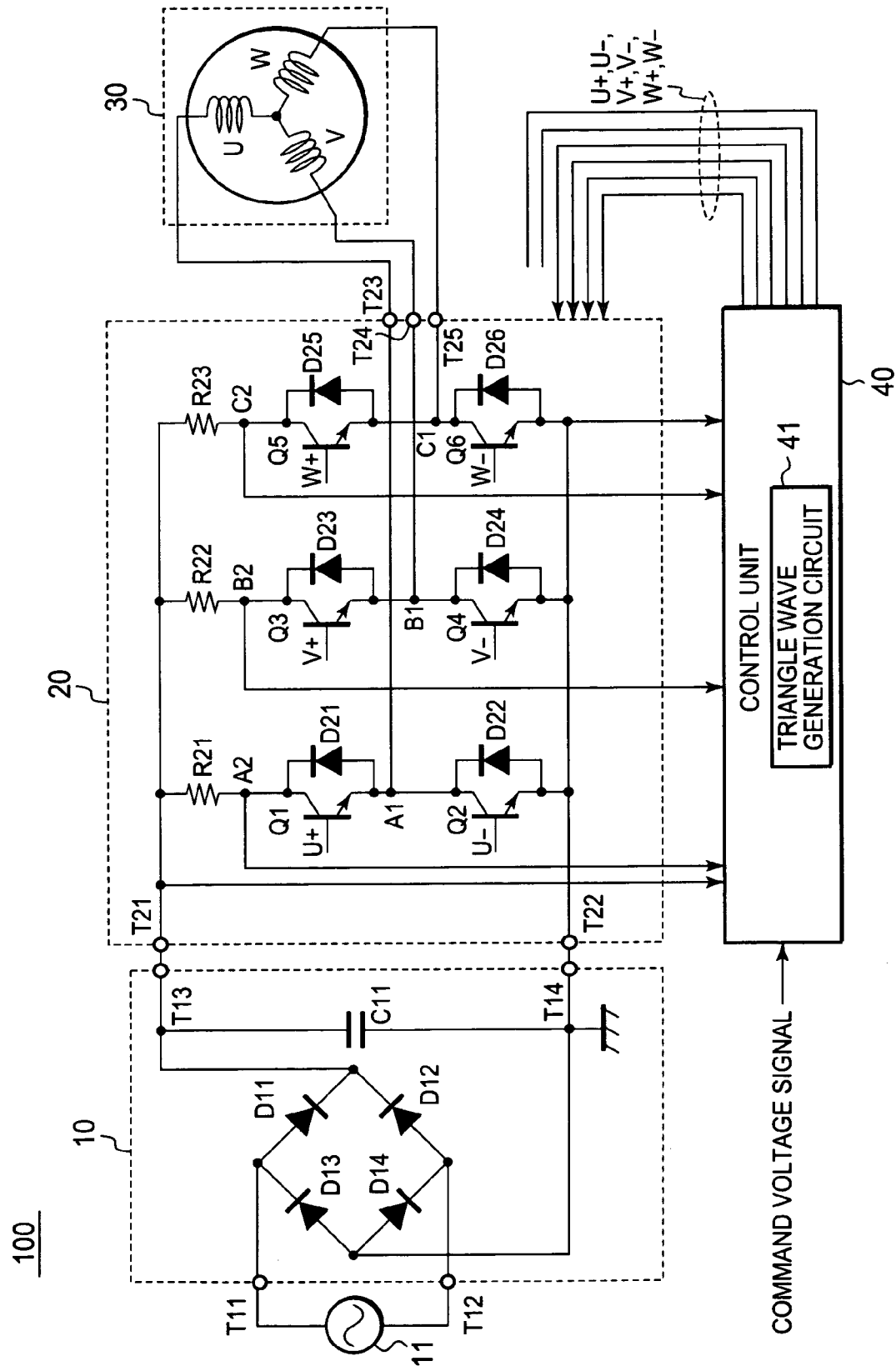
FIG. 8 illustrates a variation of a configuration of a motor driving device according to a first exemplary embodiment.

Also, as shown in FIG. 8, the resistive element R21 to R23 may be connected between the high-side transistors (Q1, Q3 and Q5) in the inverter unit 20 and the terminal 21, rather than being connected between the low-side transistors (Q2, Q4 and Q6) and the ground voltage (terminal T22) as illustrated in FIG. 1. In this case, the control unit 40 performs control so that the high-side transistors are in an on-state and the low side transistors are in an off state during an abnormal state. As described above, since it is only necessary to form a closed loop by the motor and the resistive elements R21 to R23 during an abnormal state, there is no specific limitation on the positions to connect the resistive elements R21 to R23.

Figure 9:
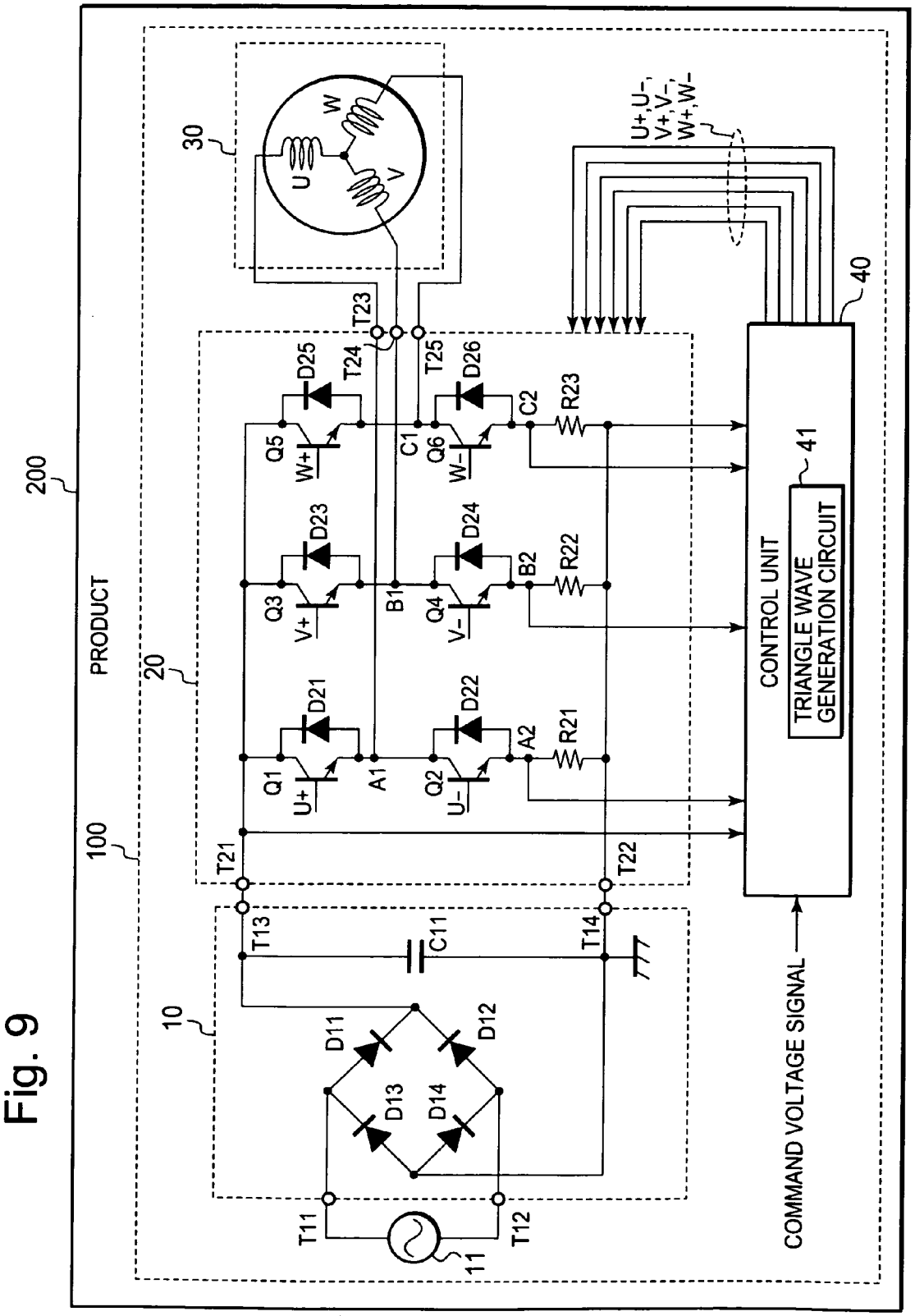
FIG. 9 is a diagram showing an example of installing in a product.

Furthermore, as shown in FIG. 9, the motor driving device may be installed in various products (a product 200 in FIG. 9), for example, home electric appliances, vehicles, etc. with great benefit.

Although the invention has been described above in connection with an exemplary embodiment thereof, it will be appreciated by those skilled in the art that this exemplary embodiment is provided solely for illustrating the invention, and should not be relied upon to construe the appended claims in a limiting sense.

Further, it is noted that, notwithstanding any claim amendments made hereafter, applicant's intent is to encompass equivalents all claim elements, even if amended later during prosecution.

What is claimed is:

1. A motor driving device, comprising:
a first power supply terminal;
a second power supply terminal;
a drive unit that is coupled to the first power supply terminal, to the second power supply terminal, and to a motor winding, the drive unit comprising:
  a first inverter comprising a first transistor and a second transistor, the first inverter being coupled between the first power supply terminal and the second power supply terminal; and
  a second inverter comprising a third transistor and a fourth transistor, the second inverter being coupled between the first power supply terminal and the second power supply terminal;
a control unit that controls the drive unit; and
a resistive element coupled between the drive unit and the first power supply terminal, the resistive element comprising:
  a first resistive element coupled between the first power supply terminal and the first transistor; and
  a second resistive element that is coupled between the first power supply terminal and the third transistor,
wherein, when a voltage between the first power supply terminal and the second power supply terminal exceeds a predetermined value, the control unit makes the motor winding and the resistive element form a loop circuit,
wherein outputs of the first and second inverters are coupled to the motor winding,
wherein, when the voltage between the first power supply terminal and the second power supply terminal exceeds the predetermined value, the control unit makes the outputs of the first and second inverters, the motor winding, and the resistive element form a loop circuit, and wherein, when the voltage between the first power supply terminal and the second power supply terminal exceeds a predetermined value, the first transistor and the third transistor are turned on, and the second transistor and the fourth transistor are turned off, thereby the first transistor, the third transistor, and the first resistive element form a loop circuit.

2. The motor driving device according to claim 1, wherein each of the first resistive element and the second resistive element comprises a shunt resistor.

3. The motor driving device according to claim 1, wherein the control unit obtains an information indicative of an amount of a current flowing in the motor winding in response to an amount of a current flowing in the resistive element.

4. The motor driving device according to claim 1, wherein the control unit is coupled to a node between the drive unit and the resistive element, and monitors a potential of the node.

5. The motor driving device according to claim 1, wherein the second resistive element is coupled to the first power supply terminal, the first transistor is coupled to the first resistive element, the second transistor is coupled between the second power supply terminal and the first transistor, the third transistor is coupled to the second resistive element, the fourth transistor is coupled between the second power supply terminal and the third transistor,
wherein the motor driving device further comprises:
a third resistive element that is coupled to the first power supply terminal,
wherein the drive unit comprises:
a fifth transistor that is coupled to the third resistive element; and
a sixth transistor that is coupled between the second power supply terminal and the fifth transistor,
wherein the motor winding comprises:
a first coil;
a second coil and
a third coil,
wherein each of one end of the first, second, and third coils is coupled with respect to one another,
wherein an other end of the first coil is coupled to a first node between the first transistor and the second transistor,
wherein an other end of the second coil is coupled to a second node between the third transistor and the fourth transistor,
wherein an other end of the third coil is coupled to a third node between the fifth transistor and the sixth transistor, and
wherein the first transistor, the third transistor, and the fifth transistor are turned on, and the second transistor, the fourth transistor, and the sixth transistor are turned off, in response to pulse signals output from the control unit, when the voltage between the first power supply terminal and the second power supply terminal exceeds the predetermined value.

6. The motor driving device according to claim 5, wherein the control unit comprises:
a triangle wave generation circuit that generates a triangle wave,
wherein the control unit receives a command voltage signal including an information for controlling a rotation speed of a motor, and generates the pulse signals in response to the triangle wave and the command voltage signal.

7. The motor driving device according to claim 5, wherein the control unit is coupled to a fourth node between the first transistor and the first resistive element, and monitors a potential of the fourth node,
wherein the control unit is coupled to a fifth node between the third transistor and the second resistive element, and monitors a potential of the fifth node, and
wherein the control unit is coupled to a sixth node between the fifth transistor and the third resistive element, and monitors a potential of the sixth node.

8. The motor driving device according to claim 1, wherein the first power supply terminal receives a ground potential.

9. The motor driving device according to claim 1, wherein the second power supply terminal receives a ground potential.

10. A product, comprising:
the motor driving device according to claim 1;
a motor that includes the motor winding; and
a converter unit that is coupled to the first power supply terminal and the second power supply terminal, and generates a direct-current power supply based on an alternating-current power supply.

11. A product, comprising:
the motor driving device according to claim 5;
a motor that includes the motor winding; and
a converter unit that is coupled to the first power supply terminal and the second power supply terminal, and generates a direct-current power supply based on an alternating-current power supply.

12. A control method for a motor driving device including a drive unit coupled to a first power supply terminal, a second power supply terminal, and a motor winding, and a resistive element coupled between the drive unit and the first power supply terminal, the control method comprising:
making the motor winding and the resistive element form a loop circuit, when a voltage between the first power supply terminal and the second power supply terminal exceeds a predetermined value,
wherein the drive unit comprises:
a first inverter that is coupled between the first power supply terminal and the second power supply terminal, and comprises a first transistor and a second transistor; and
a second inverter that is coupled between the first power supply terminal and the second power supply terminal, and comprises a third transistor and a fourth transistor,
wherein the motor winding is coupled to a first node between the first transistor and the second transistor, and to a second node between the third transistor and the fourth transistor,
wherein the resistive element comprises:
a first resistive element coupled between the first power supply terminal and the first transistor; and
a second resistive element coupled between the first power supply terminal and the third transistor, and
wherein the making the motor winding and the resistive element form the loop circuit comprises:
turning-on the first transistor and the third transistor, and turning-off the second transistor and the fourth transistor.

13. The control method according to claim 12, wherein making the motor winding and the resistive element form the loop circuit further comprises:
interrupting the power to the first power supply terminal or to the second power supply terminal.

14. A motor driving device, comprising:
a driver that comprises:
a first power supply terminal;
a second power supply terminal;
a first output terminal coupled to a motor winding;
a second output terminal coupled to the motor winding;

a first inverter; and
a second inverter;
a controller that controls the driver; and
a resistive element,
wherein the first inverter includes a first transistor coupled between the first output terminal and the second power supply terminal,
wherein the second inverter includes a second transistor coupled between the second output terminal and the second power supply terminal, and
wherein the first and second output terminals, the first and second transistors, and the resistive element form a loop circuit.

15. The motor driving device according to claim 14, wherein the controller turns on the first and second transistors to make the first and second output terminals, the first and second transistors, and the resistive element form the loop circuit, when a voltage between the first power supply terminal and the second power supply terminal exceeds a predetermined value.

16. The motor driving device according to claim 15, wherein the first inverter further includes a third transistor coupled between the first output terminal and the first power supply terminal,
wherein the second inverter further includes a fourth transistor coupled between the second output terminal and the first power supply terminal, and
wherein the controller turns off the third and fourth transistors, when the voltage between the first power supply terminal and the second power supply terminal exceeds the predetermined value.

17. The motor driving device according to claim 14, wherein the resistive element comprises:
a first resistive element coupled between the second power supply terminal and the first transistor; and
a second resistive element coupled between the second power supply terminal and the second transistor.

18. The motor driving device according to claim 14, wherein the controller is coupled to a node between the driver and the resistive element.

* * * * *